United States Patent [19]

Jenny et al.

[11] Patent Number: 4,559,784
[45] Date of Patent: Dec. 24, 1985

[54] METHOD AND APPARATUS FOR REGULATING A BYPASS FLOW OF A SUPERCHARGED INTERNAL COMBUSTION ENGINE

[75] Inventors: Ernst Jenny, Baden; Bruno Zumstein, Lucerne, both of Switzerland

[73] Assignee: BBC Brown, Boveri & Company, Limited, Baden, Switzerland

[21] Appl. No.: 129,425

[22] Filed: Mar. 12, 1980

[30] Foreign Application Priority Data

Mar. 14, 1979 [CH] Switzerland .......................... 2399/79

[51] Int. Cl.$^4$ ............................................. F02B 37/12
[52] U.S. Cl. ......................................................... 60/606
[58] Field of Search ................ 60/597, 598, 605, 606; 123/52 M; 417/191

[56] References Cited

U.S. PATENT DOCUMENTS 2,567,638 9/1951 Francois .............................. 417/191
3,796,048 3/1974 Annus et al. ........................... 60/605

FOREIGN PATENT DOCUMENTS 1451910 7/1969 Fed. Rep. of Germany ........ 60/606
421110 12/1934 United Kingdom .................. 60/606

Primary Examiner—Michael Koczo
Attorney, Agent, or Firm—Burns, Doane, Swecker & Mathis

[57] ABSTRACT

A method and apparatus for regulating a bypass flow of a turbocharged internal combustion engine is disclosed. A first preferred embodiment of the apparatus includes an air receiver which is in fluid communication with a turbocharger and an air oscillation pipe. The air oscillation pipe is in fluid communication with an inlet manifold, which inlet manifold is in fluid communication with a bypass duct and the turbocharged engine. The bypass duct is in fluid communication with the turbocharger. Pressure pulsations emanating from the engine propagate into the inlet manifold and the air oscillation pipe causing an air column within the inlet manifold and air oscillation pipe to oscillate. Periodic oscillations of the air column produces periodic pressure differences across the bypass duct, facilitating a bypass flow of air through the bypass duct.

6 Claims, 8 Drawing Figures

METHOD AND APPARATUS FOR REGULATING A BYPASS FLOW OF A SUPERCHARGED INTERNAL COMBUSTION ENGINE

BACKGROUND AND SUMMARY OF THE PRESENT INVENTION

The invention disclosed herein pertains generally to supercharged internal combustion engines, and more particularly to a method and apparatus for bypassing a portion of the air charge supplied to a supercharged internal combustion engine and diverting it to a turbocharger supplying air to the engine.

Bypass devices in supercharged internal combustion engines are used mainly in conjunction with turbochargers. Such bypass devices serve to improve the low load characteristics of supercharged internal combustion engines having elevated charge compression ratios, and are used predominantly with four stroke diesel engines which are supercharged by turbochargers. A typical bypass device includes a bypass duct which connects a charging air duct, extending downstream from the compressor of a turbocharger, to an exhaust gas duct emanating from the engine and arranged upstream from the turbine of the turbocharger. Such a bypass device typically also includes a valve arranged in the bypass duct, which valve is used to regulate the flow of air which flows from the charging air duct through the bypass duct to the turbine of the turbocharger.

By regulating the flow of air diverted from the charging air duct through the bypass duct to the turbocharger, it is possible to match the absorption capacity of the engine to the characteristics of the compressor so that a higher supercharging pressure is obtained at low loads. At maximum or full load the bypass duct is closed. Between the starting point of the engine and the full load point, the bypass valve is progressively opened as the difference between the absorption capacity of the engine and the compressor's pumping limit or the air/fuel ratio decreases. It is common practice to utilize the pressures upstream and downstream of the bypass duct, the engine speed, and the gas temperature upstream of the turbine as the variables and parameters used in controlling the bypass valve.

If the pressure gradient across the bypass duct becomes too small to enable air to flow through the bypass duct, it is possible to use heat exchangers, auxiliary combustion chambers arranged upstream of the turbine, or other means for supplying compressed air to the turbocharger. It is also known to utilize the pulsation energy of the engine exhaust gases to promote the flow of bypass air to the turbocharger. Engines with these known supplemental devices generally have satisfactory acceleration and low load characteristics, but are costly because of the expenses involved in construction.

A primary object of the present invention is to provide a method and apparatus for regulating the flow of bypass air through a bypass duct of a turbocharged internal combustion engine, which method and apparatus employ pressure pulsations produced by the periodic, alternating charging of the internal combustion engine to excite periodic pressure differences across the bypass duct, to produce an increased flow of charging air through the bypass duct.

Another object of the present invention is to provide a method and apparatus for regulating the flow of bypass air through a bypass duct of a turbocharged internal combustion engine without the use of supplemental devices.

Apparatus for regulating a flow of air through a bypass duct of a turbocharged internal combustion engine, according to a preferred embodiment of the present invention, includes a turbocharger and a six-cylinder internal combustion engine. A turbine of the turbocharger drives a compressor which supplies compressed air to the engine through a charging air duct. The charging air duct feeds compressed air from the compressor to an air receiver, which air receiver acts as a damping volume. The air receiver in turn feeds air into two air oscillation pipes, each of which pipes feeds air to one of two inlet manifolds. Each of the inlet manifolds supplies air to three cylinders of the six-cylinder engine through three suction pipes.

Six exhaust pipes feed exhaust gases from the cylinders of the six-cylinder engine to an exhaust gas manifold. In addition, two bypass ducts feed compressed air from the inlet manifolds to the exhaust gas manifold. A bypass valve and a non-return valve, which non-return valve prevents backflow, are arranged in each bypass duct, and are used to regulate the flow of compressed air through each bypass duct.

During the operation of the engine, the periodic downstroke of the piston in each cylinder produces a periodic suction effect which results in periodic pressure fluctuations propagating into the suction pipes connecting the two inlet manifolds to the engine cylinders. These pressure fluctuations propagate through each of the inlet manifolds and into each of the air oscillation pipes. The natural frequency of the column of air in each air oscillation pipe corresponds to the suction pulsation frequency of the engine in the engine speed range in which a maximum bypass flow rate is required. Thus, the air columns in the air oscillation pipes resonate in this speed range, resulting in the pressure differences across the bypass ducts reaching a maximum value, and the bypass flow rate thereby also reaching a maximum value.

BRIEF DESCRIPTION OF THE DRAWINGS

Preferred embodiments of apparatus according to the present invention are described with reference to the accompanying drawings wherein like members bear like reference numerals, and wherein.

DETAILED DESCRIPTION OF THE PREFERRED EMBODIMENTS

Figure 1:
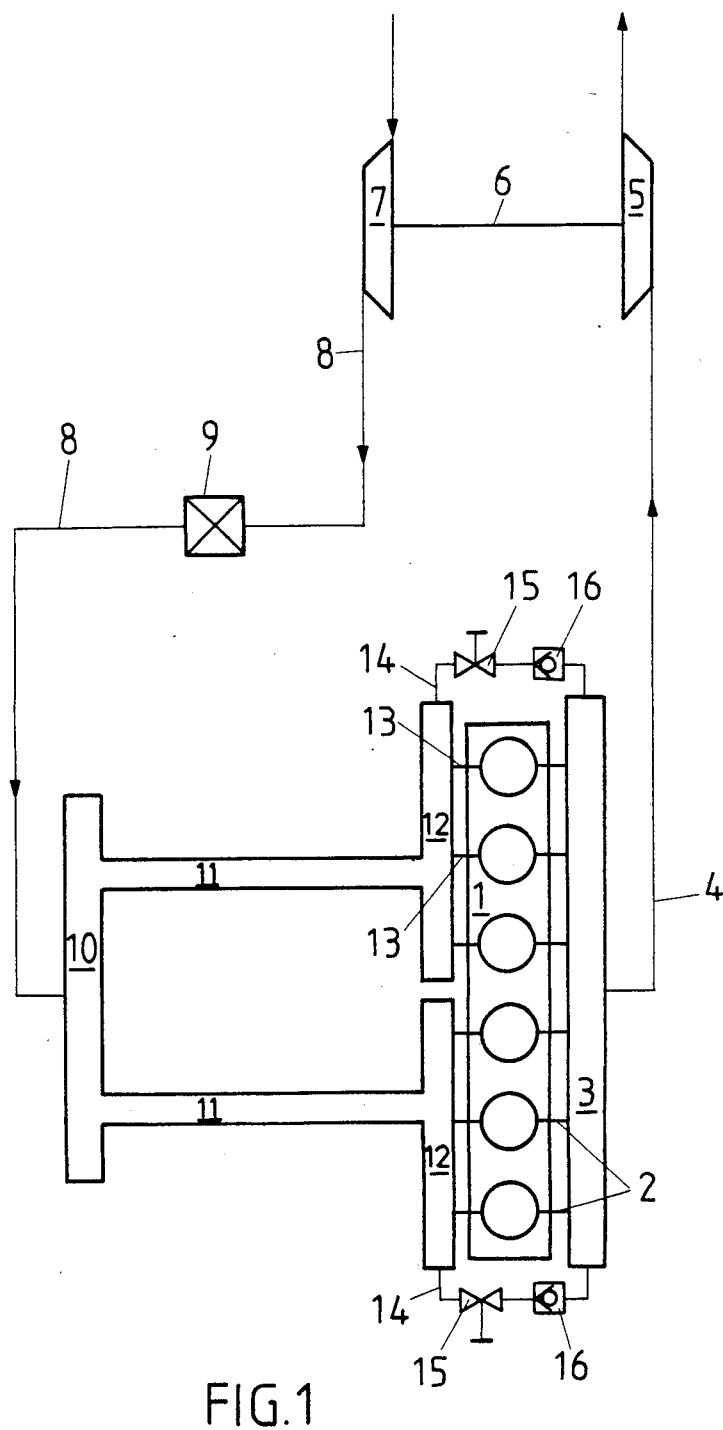
FIG. 1 is a schematic view of a turbocharged six-cylinder internal combustion engine which includes a first preferred embodiment of apparatus, according to the present invention, arranged upstream of the engine, for generating periodic pressure differences across a bypass duct, which pressure differences facilitate a flow of air through the bypass duct.

With reference to FIG. 1, a first preferred embodiment of apparatus, according to the present invention, includes a six-cylinder internal combustion engine 1, the exhaust gases of which engine are conducted through six exhaust pipes 2 into an exhaust manifold 3. The engine exhaust gases flow from the manifold 3 through an exhaust gas duct 4 toward a turbine 5 of a turbocharger, which turbine drives a compressor 7 through a turbocharger shaft 6. The compressor 7 supplies compressed air to each cylinder of the engine 1.

Charging air compressed by the air compressor 7 passes through a charging air duct 8 and a charging air cooler 9 into an air receiver 10, which air receiver functions as a damping volume. The compressed air then flows from the air receiver 10 through two air oscillation pipes 11 into two inlet manifolds 12, each of which manifolds feeds charging air to three cylinders of the engine. Each inlet manifold 12 functions as a resonance volume, the purpose of which resonance volume and the purpose of which air oscillation pipes is explained below.

Compressed air from the air receiver 10 is fed to the engine 1 by two parallel flow systems, each of which systems includes an air oscillation pipe 11 and an inlet manifold 12. The periodic suction operation of the engine cylinders produces pressure fluctuations in the suction pipes 13, which suction pipes connect each of the inlet manifolds of each flow system to three engine cylinders. These pressure fluctuations propagate from the suction pipes 13 into the inlet manifold 12 and then into the air oscillation pipe 11 of each system. It is to be noted that the inlet manifold 12 of each flow system is connected by a bypass duct 14 to the exhaust gas manifold 3 which is arranged on the exhaust side of the engine 1. The length of the air oscillation pipe 11 and the bypass duct 14 and the volume of the inlet manifold 12, of each flow system, and of the air receiver 10, are designed so that the natural frequency of the air column in each flow system corresponds to the exciting suction pulsation frequency of the engine in the speed range in which a maximum bypass flow rate is required. Resonance therefore occurs in the aforementioned speed range so that the pressure differences across each bypass duct 14 reach a maximum, and therefore the bypass air flow rates reach a maximum value.

A bypass valve 15, of known construction, and a non-return valve 16, which prevents back flow, are arranged in each bypass duct 14 of each parallel flow system to control and regulate the bypass flow. A Borda or re-entrant orifice or some other rectifying element, in which flow in the reverse direction is zero or greatly restricted, can also be used as a non-return valve. The aforementioned rectifying element ensures that, when averaged with respect to time, air only flows from the inlet manifold 12 toward and into the exhaust manifold 3.

Pressures upstream and downstream of each bypass duct 14, an engine or turbocharger speed, and a gas temperature upstream of the turbine can be used as reference variables or controlling variables for actuating the bypass valve 15. It is advantageous to provide a charging air cooler, or coolers, between each inlet manifold 12 and the corresponding cylinders fed by the inlet manifold so that the energy of the bypass air stream is not reduced by cooling.

The pressure of the engine exhaust gases in the exhaust manifold 3 may be regarded as constant by virtue of the relatively large volume of the manifold. The pressure difference across each bypass duct 14 can therefore be regarded as depending entirely on the excess of the air pressure in each inlet manifold 12 over the constant gas pressure in the exhaust manifold 3.

Figure 2:
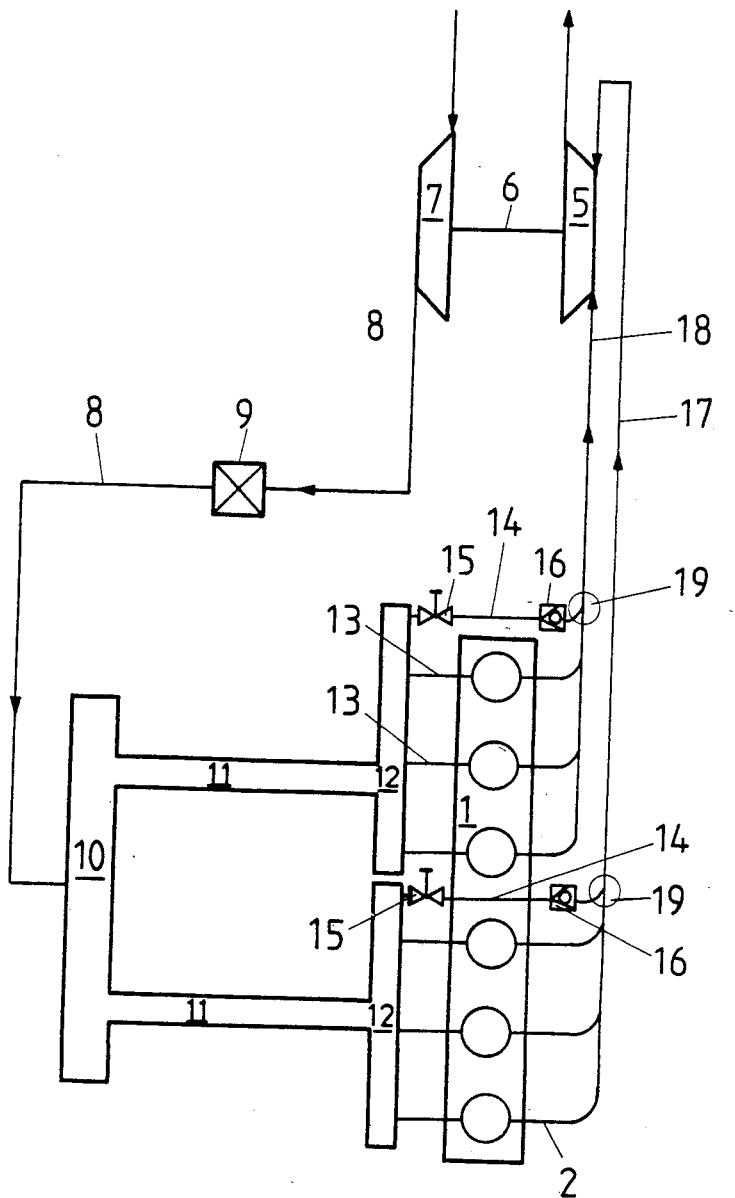
FIG. 2 is a schematic view of a turbocharged six-cylinder internal combustion engine which includes a second preferred embodiment of apparatus, according to the present invention, which second embodiment is similar to the first embodiment but differs in that the second embodiment includes injectors arranged downstream from the engine.

With reference to FIG. 2, a second preferred embodiment of apparatus according to the present invention, which is similar to the first preferred embodiment, utilizes pressure fluctuations of the engine exhaust gases on the exhaust side of the six-cylinder internal combustion engine 1, in addition to charging air pressure fluctuations on the inlet side of the engine 1, for increasing the pressure differences across the bypass ducts 14. To obtain the maximum possible pressure differences it is essential that the exhaust gas pressure fluctuations are out of phase with the corresponding charging air pressure fluctuations in the inlet manifolds 12, i.e., that a pressure peak on the inlet side always coincides with a pressure valley on the exhaust side.

The exhaust pipes 2 of every three adjacently disposed cylinders of the engine 1 merge into exhaust manifolds 17 and 18. Each of the two bypass ducts 14, each of which ducts includes a valve 15 and a non-return valve 16, connects one of the two inlet manifolds 12 to a corresponding exhaust manifold 17, 18. An injector 19 is provided at each of the places where the bypass ducts 14 merge into their respective manifolds 17, 18. These injectors are utilized to increase the total pressure differences across each of the bypass ducts 14, thereby increasing the flow rates of charging air through the bypass ducts 14.

Figure 3:
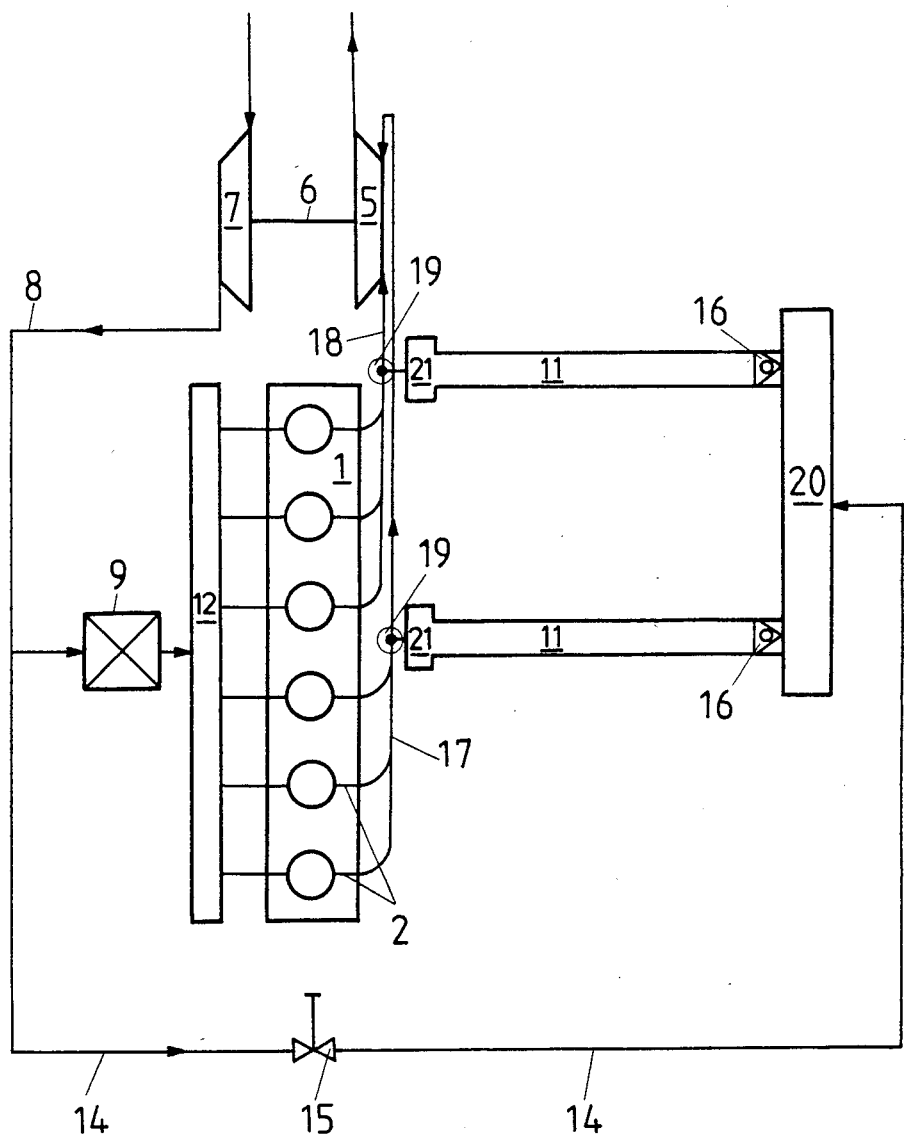
FIG. 3 is a schematic view of a turbocharged six-cylinder internal combustion engine which includes a third preferred embodiment of apparatus, according to the present invention, arranged on the downstream side of the engine.

With reference to FIG. 3, a third preferred embodiment of apparatus, according to the present invention, also includes a six-cylinder internal combustion engine 1, the exhaust gases of which engine are conducted through exhaust pipes 2 to two exhaust manifolds 17 and 18. Three cylinders of the engine 1 feed exhaust gases into manifold 17, and three cylinders feed exhaust gases into manifold 18. Each of the exhaust manifolds includes an injector 19 and each of the exhaust manifolds conducts engine exhaust gases to a turbocharger.

The turbocharger of the third preferred embodiment includes a turbine 5 which drives a compressor 7 through a turbocharger shaft 6. The compressor 7 feeds compressed air to the engine 1 through a charging air duct 8. The charging air duct 8 bifurcates at one point, one fork of the bifurcated duct 8 feeding air through a charging air cooler 9 to a single inlet manifold 12, and the other fork of the bifurcated duct 8 feeding air to a single bypass duct 14. The single inlet manifold 12 supplies compressed charging air to each of the cylinders of the six-cylinder engine 1.

The single bypass duct 14, which includes a valve 15 for regulating the flow of compressed air through the duct 14, feeds compressed air to a bypass air receiver 20 which is arranged on the exhaust side of the engine 1 and which acts as a damping volume. The bypass air receiver in turn feeds compressed air to each of two air oscillation pipes 11. Each of the pipes 11 includes a non-return valve 16 at the point where each pipe 11 merges into the bypass air receiver 20. The pipes 11 each feed compressed air to one of two bypass inlet manifolds 21, each of which bypass inlet manifolds feeds air into one of the exhaust manifolds 17, 18. The injectors 19 are located at the points where the bypass inlet manifolds merge into the exhaust manifolds 17, 18.

In the third preferred embodiment, resonance oscillation of air columns in the air oscillation pipes 11, which oscillation is amplified by the action of the injectors 19 arranged in the two exhaust manifolds 17 and 18, is utilized to increase the flow of air through the bypass duct 14. That is, exhaust gas pressure fluctuations, which fluctuations are amplified or reinforced by the action of the injectors 19 in the exhaust manifolds 17 and 18, impart an oscillation to the air columns in the air oscillation pipes 11 and in the bypass inlet manifolds 21. The oscillation of the air columns in conjunction with the periodically occurring negative pressures of the exhaust gases emanating from the engine, negative with respect to the bypass air receiver 20, serve to induce bypass air to flow through the non-return valves 16, the air oscillation pipes 11, the bypass inlet manifolds 21, the exhaust manifolds 17 and 18, and into the turbine 5.

In order for the third embodiment to operate efficiently, the air oscillation pipes 11 and the bypass inlet manifolds 21 must be so arranged that the natural frequency of the air columns therein corresponds to the frequency of the engine exhaust gas surges in the selected range of low load speeds, where high bypass flow rates are needed.

With reference again to FIG. 3, it should be noted that the non-return valves 16 or equivalent rectifying elements can also be arranged between the bypass inlet manifolds 21 and the exhaust manifolds 17 and 18.

Figure 4:
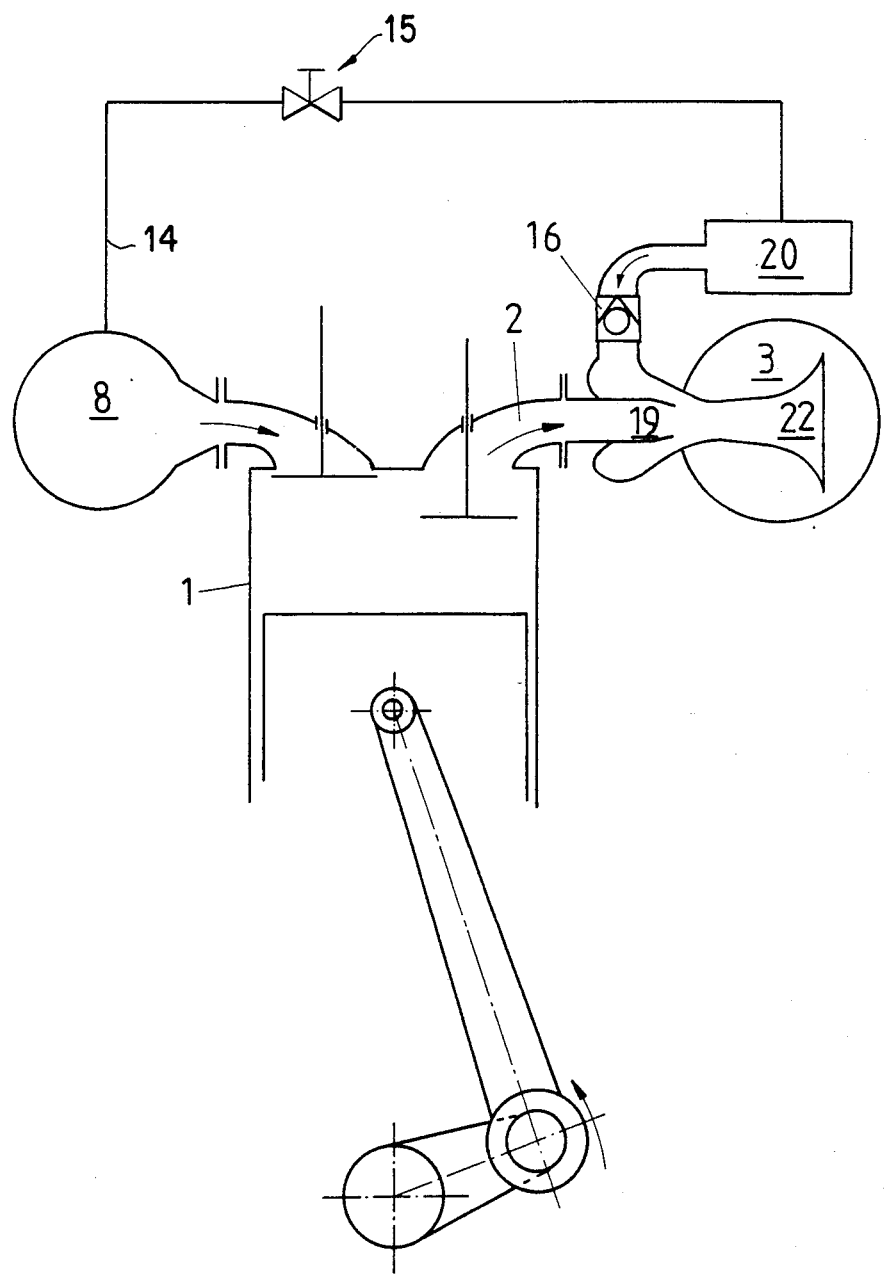
FIG. 4 is a cross-sectional view of a fourth preferred embodiment of apparatus, according to the present invention, shown in FIG. 6, which cross-sectional view is taken on the line IV—IV of FIG. 6, and which cross-sectional view shows an injector and a diffuser arranged on the downstream side of a turbocharged, internal combustion engine.

With reference to FIG. 4, an apparatus which is included in a fourth preferred embodiment of the present invention uses the principle of reflection of periodic pressure waves at an open end of a tube to excite periodic induction waves. The apparatus includes an injector 19 arranged at the end of a short exhaust pipe 2, which injector adjoins an open-ended diffuser 22. The diffuser 22 extends into an exhaust manifold 3 in which a practically constant gas pressure prevails. A non-return valve 16 is arranged within a pipe which connects a bypass air receiver 20 to the injector 19.

In operation, periodic pressure fluctuations of the exhaust gases emanating from the engine 1 are reinforced by the injector 19. Further reinforcement of the periodic pressure fluctuations is effected by reflection of the pressure waves traveling through the diffuser 22 at the open end of the diffuser 22, to produce large periodic pressure differences between the bypass air receiver 20 and the injectors 19. The action of the induction waves increases with increasing length of the duct between the injector 19 and the diffuser 22.

If other means are sufficient to ensure adequate delivery of the bypass air it is possible to dispense with the injector action so that the loss of head of exhaust gases can be minimized.

With reference again to FIG. 4, it is to be noted that an injector 19 is not essential. Rather, it is possible for the confluence of the exhaust pipe 2, emanating from the engine 1, and the bypass duct to be constructed so that the two flows, i.e., the flow of exhaust gases through the exhaust pipe 2 and the bypass flow of compressed air in the bypass duct, are oriented in the same direction in the region where the two flows mix. For example, the confluence of the exhaust pipe and the bypass duct may be in the form of a cylindrical exhaust pipe which enters the bypass duct or in the form of two ducts which join at an acute angle in the flow direction.

Figure 5:
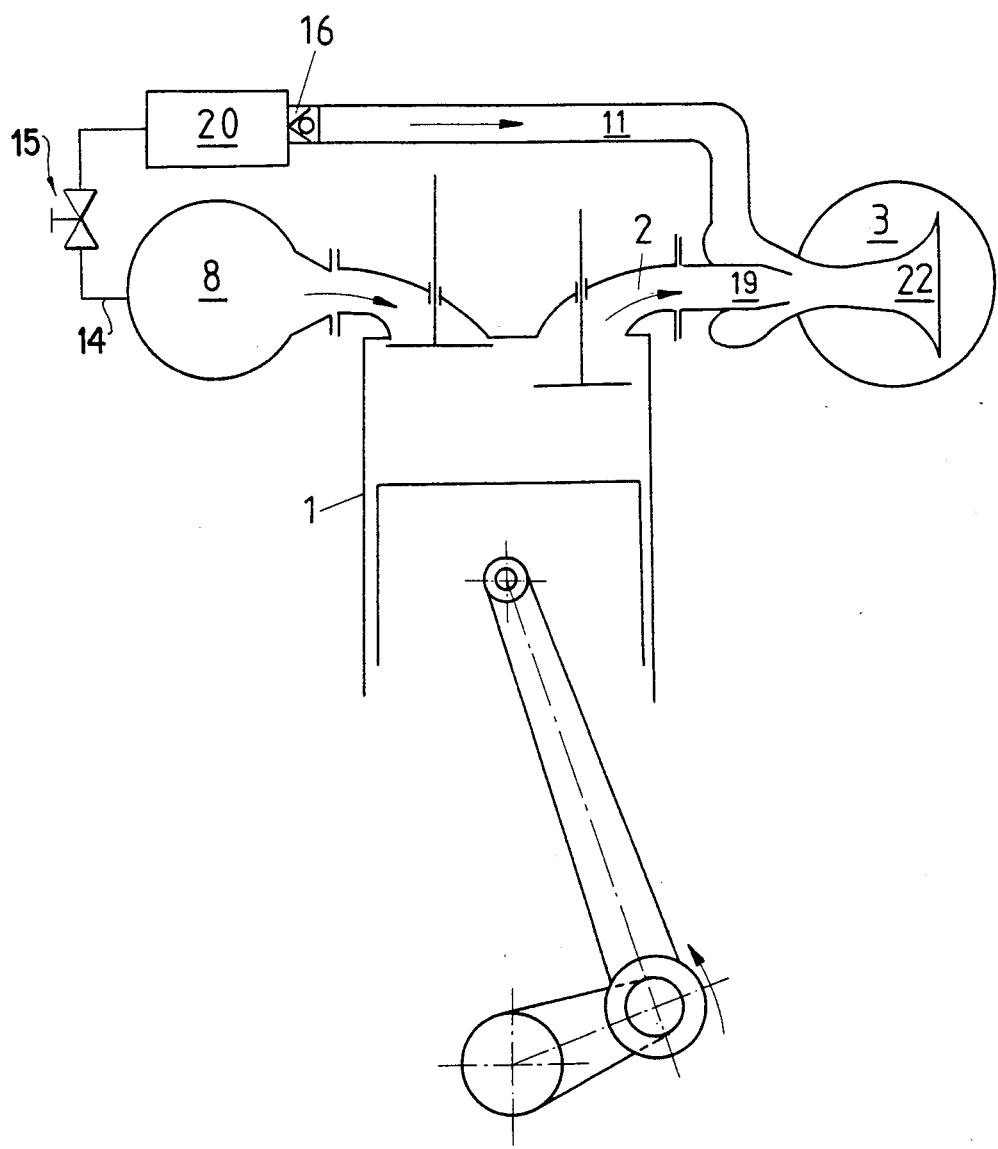
FIG. 5 is a cross-sectional view of a fifth preferred embodiment of apparatus, according to the present invention, shown in FIG. 7, which cross-sectional view is taken on the line V—V of FIG. 7, and which cross-sectional view shows an injector, a diffuser, and an air oscillation pipe arranged on the downstream side of a turbocharged internal combustion engine.

With reference to FIG. 5, a modification of the apparatus shown in FIG. 4 includes an air oscillation pipe 11 arranged between the bypass air receiver 20 and the injector 19 so that a reinforced delivery of compressed air is obtained. As shown in FIG. 5, the non-return valve 16 may be arranged adjacent the bypass air receiver 20 rather than adjacent the injector 19.

Figure 6:
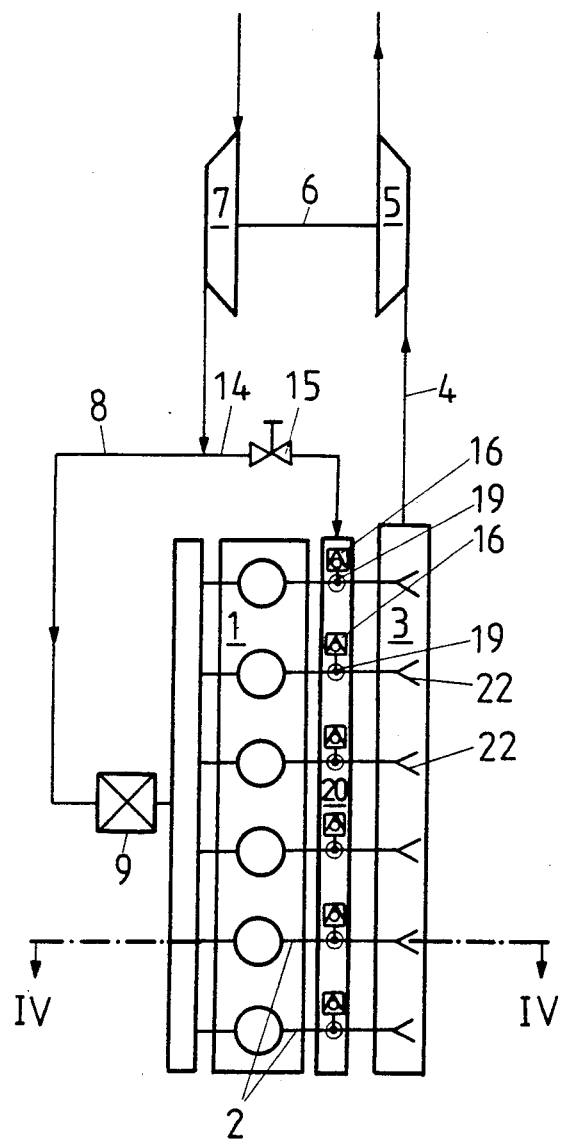
FIG. 6 is a schematic view of a turbocharged six-cylinder internal combustion engine which includes a fourth preferred embodiment of apparatus, according to the present invention.

With reference to FIG. 6, a fourth preferred embodiment of apparatus, according to the present invention, which incorporates the device shown in FIG. 4, includes a six-cylinder internal combustion engine 1. Exhaust gases from the engine 1 flow through six exhaust pipes 2 into six injectors 19. The exhaust gases flowing through each of the injectors 19 flow, respectively, into six diffusers 22, the ends of which diffusers open into an exhaust manifold 3. The exhaust manifold 3 conducts the exhaust gases to a turbine 5 of a turbocharger, which turbine drives a compressor 7 through a turbocharger shaft 6.

Compressed air supplied by the compressor 7 flows through a duct which feeds compressed air to a charging air duct 8 as well as to a bypass duct 14. The compressed air flowing through the charging air duct 8 flows through a charging air cooler 9 and into an inlet manifold, which inlet manifold feeds compressed air to each cylinder of the engine 1.

The bypass duct 14, which includes a valve 15 for regulating the flow of air through the duct 14, feeds compressed air to a bypass air receiver arranged on the exhaust side of the engine 1. Six pipes connect the bypass air receiver to the six diffusers 19 which conduct both engine exhaust gases from the exhaust pipes 2, and compressed air from the bypass air receiver, to the exhaust manifold 3. A non-return valve 16 is arranged in each of the six pipes.

Figure 7:
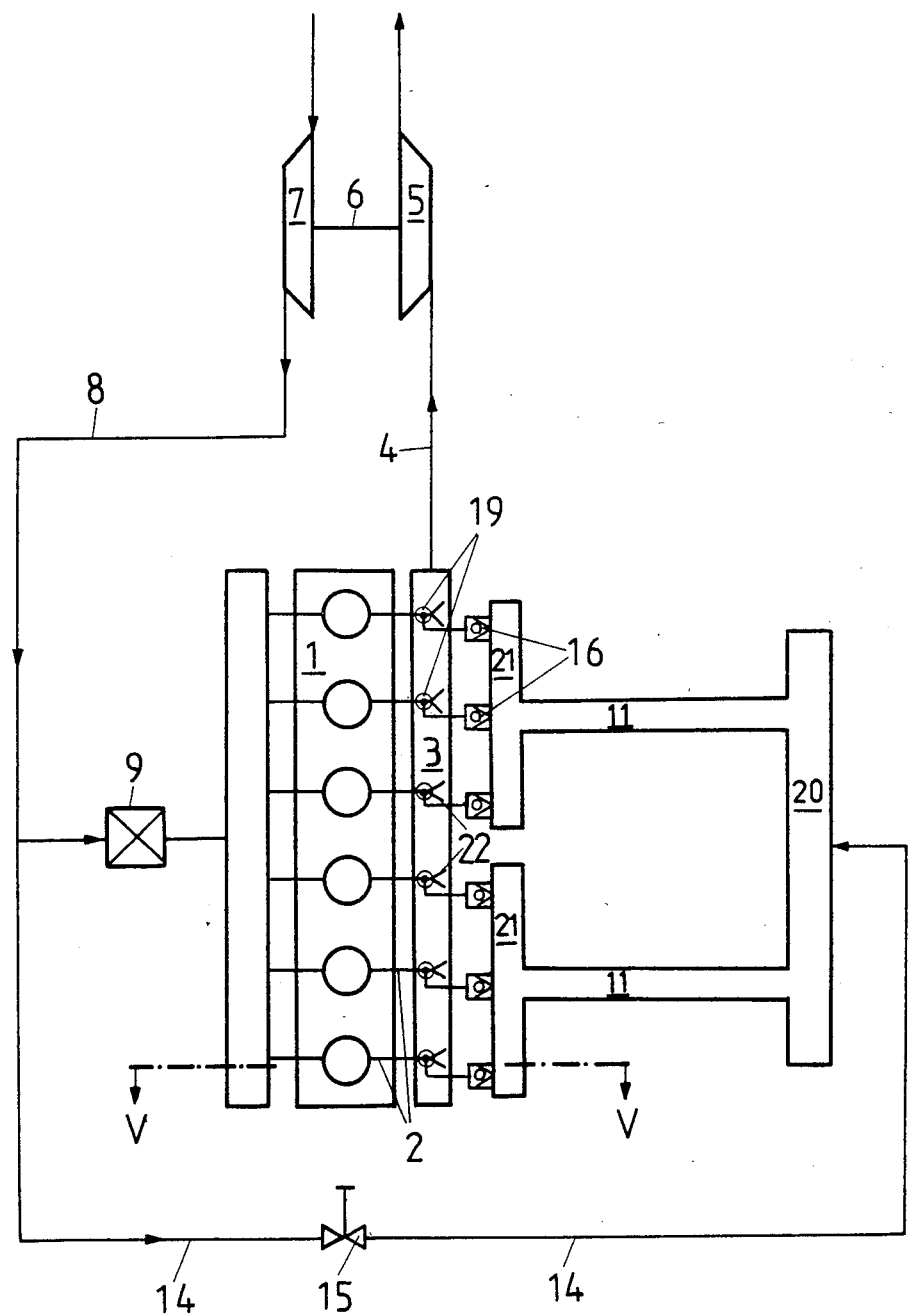
FIG. 7 is a schematic view of a turbocharged six-cylinder internal combustion engine which includes a fifth preferred embodiment of apparatus, according to the present invention.

With reference to FIG. 7, a fifth preferred embodiment of apparatus according to the present invention, which incorporates the device shown in FIG. 5, includes a six-cylinder internal combustion engine 1. Exhaust gases from the engine 1 flow through six exhaust pipes 2 into six injectors 19. The exhaust gases flowing through each of the injectors 19 flow, respectively, into six diffusers 22, the ends of which diffusers open into an exhaust manifold 3. The exhaust manifold 3 conducts the exhaust gases to a turbine 5 of a turbocharger, which turbine drives a compressor 7 through a turbocharger shaft 6.

The compressor 7 feeds compressed air to the engine 1 through a charging air duct 8. The charging air duct 8 bifurcates at one point, one fork of the bifurcated duct 8 feeding air through a charging air cooler 9 to a single inlet manifold, and the other fork of the bifurcated duct 8 feeding air to a single bypass duct 14. The single inlet manifold supplies compressed charging air to each of the cylinders of the six-cylinder engine 1.

The bypass duct 14, which includes a valve 15 for regulating the flow of compressed air through the duct 14, feeds compressed air to a bypass air receiver 20, arranged on the exhaust side of the engine 1. The bypass air receiver in turn feeds compressed air to each of two air oscillation pipes 11. Each of the air oscillation pipes 11 feeds air to one of two bypass inlet manifolds 21, and each of the bypass inlet manifolds 21 is connected by three pipes to three of the six injectors 19. Thus, the injectors 19 feed a mixture of exhaust gases from the engine 1 and compressed air from the inlet manifolds 21 into the six diffusers 22, which diffusers feed this mixture into the exhaust manifold 3. The exhaust manifold then feeds this mixture to the turbihe 5.

Figure 8:
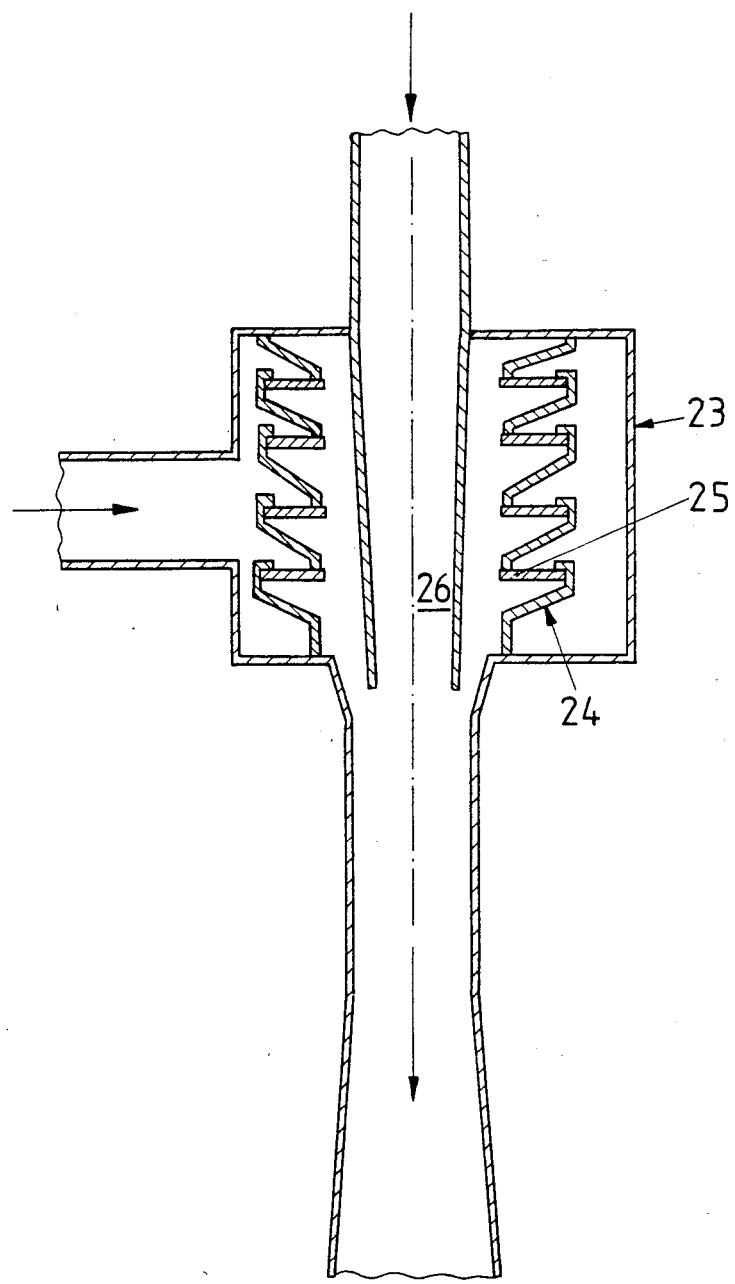
FIG. 8 is a cross-sectional view of an injector arranged within a tower valve, which tower valve functions as a non-return valve.

With reference to FIG. 8, a tower valve 23 may be used as a rectifying element, i.e., as a non-return valve, in the embodiments of the present invention which employ injectors. This valve includes a plurality of serially arranged plate valves 24, each of which plate valves has an easily movable, low-inertia valve plate 25. An injector nozzle 26 is centrally arranged with the tower valve 23.

The tower valve 23 is particularly suitable to the present invention because the volume between the end of the injector nozzle 26, where minimum pressure prevails, and the valve plates 25, can be kept very small so that pressure differences are able to act fully and a particularly good delivery effect is obtained.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. Apparatus for diverting and regulating a bypass flow of a turbosupercharged internal combustion piston engine, comprising:
    an internal combustion engine having an exhaust manifold,
    a turbosupercharger for supplying compressed air to said internal combustion engine to produce a supercharging of said engine,
    bypass means for diverting a portion of compressed air to said exhaust manifold,
        said bypass means including at least one bypass duct with valve means for regulating a flow of said compressed air through said bypass duct, and a non-return valve, and
        at least one oscillation pipe and at least one air inlet manifold downstream therefrom, said at least one oscillation pipe containing a column of air for generating periodic pressure pulsations in the at least one inlet manifold and periodic pressure differences across said bypass means for diverting a part of said compressed air via said non-return valve to said exhaust manifold, said column of air in the at least one oscillation pipe being responsive to pressure pulsations emanating from the strokes of the pistons of said engine within a predetermined range of engine speeds, and the length of the at least one oscillation pipe being dimensioned so that the natural frequency of its column of air at least approximately equals the frequency of said pressure pulsations corresponding to said predetermined range of engine speeds.

2. Apparatus in accordance with claim 1 including at least one suction pipe, the first end of which is connected to the at least one inlet manifold and the second end of which suction pipe is connected to a cylinder of said engine.

3. Apparatus in accordance with claim 1 or 2 further comprising an injector arranged at a point of entry of said at least one bypass duct into said at least one exhaust manifold, the injector comprising a nozzle at the end of the bypass duct discharging into the exhaust manifold, the exhaust gases thereby augmenting the bypass flow.

4. Apparatus in accordance with claim 3, wherein said valve means includes a plurality of axially spaced annular members surrounding said injector, the spacing between adjacent ones of said annular members being occupied by a one-way movable plate which is responsive to air pressure from said bypass to open and conduct air from said bypass to said injector.

5. A method for diverting and regulating a bypass flow of a supercharged internal combustion piston engine, comprising the steps of:
    supplying compressed air from a source of said air to an internal combustion engine to produce a supercharging of said engine,
    diverting a portion of said compressed air from said source to the exhaust side of said engine through a bypass duct, and
    generating periodic pressure differences across said bypass duct to promote a flow of said compressed air through said bypass duct, said periodic pressure differences being generated by an oscillating air column brought into resonance in response to pressure pulsations emanating from the strokes of the pistons of said engine in a predetermined range of engine speeds, said air column being arranged within a conduit, and said conduit being in fluid communication with the inlet side of said engine and said bypass duct.

6. The method of claim 5, wherein said periodic pressure differences are generated in response to pressure pulsations emanating from an inlet side of said engine.

* * * * *